US008928682B2

(12) United States Patent
Bell et al.

(10) Patent No.: US 8,928,682 B2
(45) Date of Patent: Jan. 6, 2015

(54) METHOD AND SYSTEM OF PROCESSING IMAGES FOR IMPROVED DISPLAY

(75) Inventors: Gareth P Bell, Auckland (NZ); Darryl Singh, Auckland (NZ); Hayden James Rosser, Auckland (NZ)

(73) Assignee: Pure Depth Limited, Auckland (NZ)

( * ) Notice: Subject to any disclaimer, the term of this patent is extended or adjusted under 35 U.S.C. 154(b) by 418 days.

(21) Appl. No.: 12/831,173

(22) Filed: Jul. 6, 2010

(65) Prior Publication Data

US 2011/0007089 A1  Jan. 13, 2011

Related U.S. Application Data

(60) Provisional application No. 61/223,650, filed on Jul. 7, 2009, provisional application No. 61/223,672, filed on Jul. 7, 2009, provisional application No. 61/296,430, filed on Jan. 19, 2010.

(51) Int. Cl.
*G09G 5/00* (2006.01)
(Continued)

(52) U.S. Cl.
CPC ........... *G09G 3/34* (2013.01); *G09G 2300/023* (2013.01); *H04N 13/0495* (2013.01); *G09G 3/3406* (2013.01); *G09G 3/003* (2013.01); *G09G 2320/0673* (2013.01)
USPC ................ 345/589; 345/4; 345/419; 345/422

(58) Field of Classification Search
CPC .................... G09G 2300/02; G09G 2300/023; G09G 3/003; G02B 27/2271; G02B 27/2278; G02B 27/2285; H04N 13/0418; H04N 13/042; H04N 13/044; H04N 13/0443; H04N 13/0468; H04N 13/047; H04N 13/0475; H04N 13/0477; H04N 13/0481; H04N 13/0488; H04N 13/0493; H04N 13/0495; H04N 13/0497
USPC .......................... 345/4–9, 419, 422, 593, 589
See application file for complete search history.

(56) References Cited

U.S. PATENT DOCUMENTS 3,863,246 A   1/1975   Trcka et al.
3,967,881 A   7/1976   Moriyama et al.
(Continued)

FOREIGN PATENT DOCUMENTS

AU   2480600   7/2000
AU   2453800   8/2000
(Continued)

OTHER PUBLICATIONS

Hideaki Takada, Shiro Suyama, Munekazu Date, Kazuo Kimura, Front and Rear Image Generation Module for Depth-fused 3-D Display 2006, IEEE Transactions on Consumer Electronics, 52(3):904-908.*

(Continued)

*Primary Examiner* — Phi Hoang
*Assistant Examiner* — Michael J Cobb

(57) ABSTRACT

Image processing may be performed to generate a color image for display on a color display screen and a monochrome image for display on a monochrome display screen, where an overlap of the images may produce a resultant color image at one or more depths. The one or more depths may be determined by an amount of blur applied to one image and an amount of sharpness applied to other. The one or more depths may be determined by a gamma value of the monochrome image. Since the monochrome display screen may have fewer or no color filters and/or a lower resolution, the monochrome display screen may pass more light than conventional color display screens. As such, less light can be used to illuminate color images displayed at different depths using a color display screen and a monochrome display screen, thereby reducing energy consumption of the display device.

30 Claims, 7 Drawing Sheets

(51) Int. Cl.
*G06T 15/00* (2011.01)
*G06T 15/40* (2011.01)
*G09G 5/02* (2006.01)
*G09G 3/00* (2006.01)
*H04N 13/04* (2006.01)
*G09G 3/34* (2006.01)

(56) References Cited

U.S. PATENT DOCUMENTS

| | | | |
|---|---|---|---|
| 4,294,516 A | 10/1981 | Brooks | |
| 4,333,715 A | 6/1982 | Brooks | |
| 4,364,039 A | 12/1982 | Penz | |
| 4,371,870 A | 2/1983 | Biferno | |
| 4,472,737 A | 9/1984 | Iwasaki | |
| 4,485,376 A | 11/1984 | Noble | |
| 4,523,848 A | 6/1985 | Gorman et al. | |
| 4,568,928 A | 2/1986 | Biferno | |
| 4,649,425 A | 3/1987 | Pund | |
| 4,757,626 A | 7/1988 | Weinreich | |
| 4,768,300 A | 9/1988 | Rutili | |
| 4,815,742 A | 3/1989 | Augustine | |
| 5,050,965 A | 9/1991 | Conner et al. | |
| 5,075,993 A | 12/1991 | Weinreich | |
| 5,112,121 A | 5/1992 | Chang et al. | |
| 5,113,272 A | 5/1992 | Reamey | |
| 5,124,803 A | 6/1992 | Troxel | |
| 5,198,936 A | 3/1993 | Stringfellow | |
| 5,298,892 A | 3/1994 | Shapiro et al. | |
| 5,300,942 A | 4/1994 | Dolgoff | |
| 5,302,946 A | 4/1994 | Shapiro et al. | |
| 5,361,165 A | 11/1994 | Stringfellow et al. | |
| 5,367,801 A | 11/1994 | Ahn | |
| 5,369,450 A | 11/1994 | Haseltine et al. | |
| 5,473,344 A | 12/1995 | Bacon et al. | |
| 5,515,484 A | 5/1996 | Sfarti et al. | |
| 5,585,821 A | 12/1996 | Ishikura et al. | |
| 5,675,755 A | 10/1997 | Trueblood | |
| 5,694,532 A | 12/1997 | Carey et al. | |
| 5,695,346 A | 12/1997 | Sekiguchi et al. | |
| 5,745,197 A | 4/1998 | Leung et al. | |
| 5,764,317 A | 6/1998 | Sadovnik et al. | |
| 5,805,163 A | 9/1998 | Bagnas | |
| 5,825,436 A | 10/1998 | Knight | |
| 5,924,870 A | 7/1999 | Brosh et al. | |
| 5,982,417 A | 11/1999 | Blonde | |
| 5,990,990 A | 11/1999 | Crabtree | |
| 5,999,191 A | 12/1999 | Frank et al. | |
| 6,005,654 A | 12/1999 | Kipfer et al. | |
| 6,054,969 A | 4/2000 | Haisma | |
| 6,215,490 B1 | 4/2001 | Kaply | |
| 6,215,538 B1 | 4/2001 | Narutaki et al. | |
| 6,341,439 B1 | 1/2002 | Lennerstad | |
| 6,356,281 B1 | 3/2002 | Isenman | |
| 6,369,830 B1 | 4/2002 | Brunner et al. | |
| 6,388,648 B1 | 5/2002 | Clifton et al. | |
| 6,438,515 B1 | 8/2002 | Crawford et al. | |
| 6,443,579 B1 | 9/2002 | Myers | |
| 6,525,699 B1 | 2/2003 | Suyama et al. | |
| 6,538,660 B1 | 3/2003 | Celi, Jr. et al. | |
| 6,587,118 B1 | 7/2003 | Yoneda | |
| 6,593,904 B1 | 7/2003 | Marz et al. | |
| 6,609,799 B1 | 8/2003 | Myers | |
| 6,661,425 B1 | 12/2003 | Hiroaki | |
| 6,697,135 B1 | 2/2004 | Baek et al. | |
| 6,717,728 B2 | 4/2004 | Putilin | |
| 6,720,961 B2 | 4/2004 | Tracy | |
| 6,845,578 B1 | 1/2005 | Lucas | |
| 6,906,762 B1 | 6/2005 | Witehira et al. | |
| 6,940,507 B2 | 9/2005 | Repin et al. | |
| 6,958,748 B1 | 10/2005 | Fukui et al. | |
| 7,113,188 B2 | 9/2006 | Kuroda et al. | |
| 7,714,821 B2* | 5/2010 | Seen | 345/87 |
| 7,787,688 B1* | 8/2010 | Kass | 382/154 |
| 8,022,962 B2* | 9/2011 | Kurabayashi | 345/589 |
| 8,146,277 B2 | 4/2012 | Engel | |
| 8,154,473 B2 | 4/2012 | Engel et al. | |
| 8,416,149 B2 | 4/2013 | Evanicky | |
| 8,432,411 B2 | 4/2013 | Bell et al. | |
| 8,436,873 B2 | 5/2013 | Gao | |
| 2002/0001055 A1 | 1/2002 | Kimura et al. | |
| 2002/0093516 A1 | 7/2002 | Brunner et al. | |
| 2002/0105516 A1 | 8/2002 | Tracy | |
| 2002/0118275 A1* | 8/2002 | Harman | 348/51 |
| 2002/0126115 A1 | 9/2002 | Ijntema | |
| 2002/0126396 A1 | 9/2002 | Dolgoff | |
| 2002/0163728 A1 | 11/2002 | Myers | |
| 2002/0163729 A1 | 11/2002 | Myers | |
| 2003/0090455 A1 | 5/2003 | Daly | |
| 2003/0132895 A1 | 7/2003 | Berstis | |
| 2003/0184665 A1 | 10/2003 | Berstis | |
| 2004/0008866 A1* | 1/2004 | Rhoads et al. | 382/100 |
| 2004/0239582 A1 | 12/2004 | Seymour | |
| 2005/0047657 A1* | 3/2005 | Lee | 382/167 |
| 2005/0062897 A1 | 3/2005 | Lei | |
| 2005/0146787 A1 | 7/2005 | Lukyanitsa | |
| 2006/0227249 A1 | 10/2006 | Chen et al. | |
| 2007/0024614 A1* | 2/2007 | Tam et al. | 345/419 |
| 2007/0024642 A1 | 2/2007 | Kooi et al. | |
| 2007/0036456 A1* | 2/2007 | Hooper | 382/274 |
| 2007/0147698 A1* | 6/2007 | Reid | 382/263 |
| 2007/0165027 A1* | 7/2007 | Nakadaira et al. | 345/426 |
| 2007/0230788 A1* | 10/2007 | Lei | 382/186 |
| 2007/0242186 A1* | 10/2007 | Ikeno et al. | 349/74 |
| 2007/0252804 A1 | 11/2007 | Engel et al. | |
| 2007/0279500 A1* | 12/2007 | Castorina et al. | 348/254 |
| 2008/0030672 A1* | 2/2008 | Lee et al. | 349/191 |
| 2008/0088649 A1* | 4/2008 | Ikeno et al. | 345/690 |
| 2008/0278574 A1* | 11/2008 | Ramstad | 348/51 |
| 2009/0135090 A1 | 5/2009 | Kim | 345/6 |
| 2009/0146933 A1* | 6/2009 | Visser et al. | 345/87 |
| 2009/0147186 A1* | 6/2009 | Nakai et al. | 349/74 |
| 2009/0284678 A1* | 11/2009 | Yang et al. | 349/46 |
| 2010/0080459 A1* | 4/2010 | Dai et al. | 382/170 |
| 2011/0043549 A1* | 2/2011 | Chestakov et al. | 345/690 |
| 2013/0215105 A1* | 8/2013 | Yonezu | 345/419 |

FOREIGN PATENT DOCUMENTS

| | | |
|---|---|---|
| AU | 6821901 | 12/2001 |
| CA | 2075807 | 1/1979 |
| CA | 2009960 | 8/1990 |
| CN | 1293805 | 5/2001 |
| CN | 1294695 | 5/2001 |
| DE | 2730785 | 1/1979 |
| DE | 29912074 | 11/1999 |
| DE | 19920789 | 5/2000 |
| EP | 0389123 | 9/1990 |
| EP | 454423 | 10/1991 |
| EP | 0460314 | 12/1991 |
| EP | 595387 | 4/1994 |
| EP | 0605945 | 7/1994 |
| EP | 0703563 | 3/1996 |
| EP | 0732669 | 9/1996 |
| EP | 0802684 | 10/1997 |
| EP | 0999088 | 5/2000 |
| EP | 1177527 | 11/2000 |
| EP | 1093008 | 4/2001 |
| EP | 1151430 | 11/2001 |
| EP | 1287401 | 3/2003 |
| FR | 2609941 | 7/1988 |
| GB | 2312584 | 10/1997 |
| GB | 2347003 | 8/2000 |
| GB | 2372618 | 8/2002 |
| JP | 61248083 | 11/1986 |
| JP | 63158587 | 7/1988 |
| JP | 3021902 | 1/1991 |
| JP | 3174580 | 7/1991 |
| JP | 3186894 | 8/1991 |
| JP | 3226095 | 10/1991 |
| JP | 3282586 | 12/1991 |
| JP | 4191755 | 7/1992 |
| JP | 4220691 | 8/1992 |
| JP | 4251219 | 9/1992 |

(56) References Cited

FOREIGN PATENT DOCUMENTS

| | | |
|---|---|---|
| JP | 5040449 | 2/1993 |
| JP | 6317488 | 11/1994 |
| JP | 8036375 | 2/1996 |
| JP | 8095741 | 4/1996 |
| JP | 09033858 | 2/1997 |
| JP | 9146751 | 6/1997 |
| JP | 9244057 | 9/1997 |
| JP | 9282357 | 10/1997 |
| JP | 9308769 | 12/1997 |
| JP | 10003355 | 1/1998 |
| JP | 10039821 | 2/1998 |
| JP | 10105829 | 4/1998 |
| JP | 10228347 | 8/1998 |
| JP | 10334275 | 12/1998 |
| JP | 11205822 | 7/1999 |
| JP | 11272846 | 10/1999 |
| JP | 200099237 | 4/2000 |
| JP | 2000142173 | 5/2000 |
| JP | 2000347645 | 12/2000 |
| JP | 200156675 | 2/2001 |
| JP | 2001100689 | 4/2001 |
| JP | 2001215332 | 8/2001 |
| JP | 2001324608 | 11/2001 |
| JP | 2002504764 | 2/2002 |
| JP | 2002099223 | 4/2002 |
| JP | 2002131775 | 5/2002 |
| JP | 2002350772 | 12/2002 |
| JP | 2002544544 | 12/2002 |
| JP | 2003507774 | 2/2003 |
| JP | 2003316335 | 11/2003 |
| NO | 20005178 | 4/2001 |
| PL | 343229 | 4/2001 |
| WO | 88/05389 | 7/1988 |
| WO | 91/12554 | 8/1991 |
| WO | 98/47106 | 10/1998 |
| WO | 99/42889 | 8/1999 |
| WO | 9942889 | 8/1999 |
| WO | 99/44095 | 9/1999 |
| WO | 9945526 | 9/1999 |
| WO | 00/36578 | 6/2000 |
| WO | 00/48167 | 8/2000 |
| WO | 00/68887 | 11/2000 |
| WO | 01/01290 | 1/2001 |
| WO | 01/15127 | 3/2001 |
| WO | 01/15128 | 3/2001 |
| WO | 01/57799 | 8/2001 |
| WO | 01/95019 | 12/2001 |
| WO | 02/35277 | 5/2002 |
| WO | 02/084637 | 10/2002 |
| WO | 02/091033 | 11/2002 |
| WO | 03/003109 | 1/2003 |
| WO | 03/023491 | 3/2003 |
| WO | 03/032058 | 4/2003 |
| WO | 03/040820 | 5/2003 |
| WO | 04/001488 | 12/2003 |
| WO | 04/002143 | 12/2003 |
| WO | 2004/102520 | 11/2004 |
| ZA | 9703025 | 11/1997 |

OTHER PUBLICATIONS

"Display", http://web.archive.org/web/20010717132509/http://whatis.techtarget.com/definition/0,,sid9_gci211965,00.html, Jul. 27, 2000.
"Teamworkstation 1989-1994," http://web.media.mit.edu/~ishii/TWS.html, pp. 1-4, 1994.
"TEXTARC: An Alternate Way to View a Text," http://textarc.org, p. 1, 2002.
"TEXTARC: NYSCA Grant and Public Installation," http//textarc.org, p. 1, 2002.
"TEXTARC: The Print and the Artist," http://textarc.org, p. 1, 2002.
Clearboard 1991-1994, http://web.media.mit.edu/~ishii/CB.html, pp. 1-3, 1994.
Courter et al., Microsoft Office 2000 Professional Edition, Sybex Inc., pp. xxxi, 543, 685, 1999.
Harrison et al., "Transparent Layered User Interfaces: An Evaluation of a Display Design to Enhance Focused and Divided Attention" ACM, pp. 1-13 pages, 1995.
Ishii et al., "Iterative Design of Seamless Collaboration Media", Communications of the ACM, vol. 37, pp. 83-97, 1994.
Non-Final Office Action Mailed Mar. 29, 2006; U.S. Appl. No. 10/489,101.
Notice of Abandonment Mailed Jul. 16, 2007; U.S. Appl. No. 10/489,101.
Non-Final Office Action Mailed Jul. 28, 2005; U.S. Appl. No. 10/489,101.
Office Action Mailed Nov. 22, 2005; U.S. Appl. No. 10/489,101.
Non-Final Office Action Mailed Feb. 2, 2009; U.S. Appl. No. 10/519,285.
Office Action Mailed May 28, 2008; U.S. Appl. No. 10/519,285.
Non-Final Office Action Mailed Sep. 10, 2007; U.S. Appl. No. 10/519,2085.
Office Action Mailed Sep. 17, 2008; U.S. Appl. No. 10/519,285.
Office Action Mailed Jan. 11, 2010; U.S. Appl. No. 10/519,285.
Office Action Mailed May 25, 2010; U.S. Appl. No. 10/519,285.
Office Action Mailed Aug. 17, 2009; U.S. Appl. No. 10/519,285.
Office Action Mailed Feb. 24, 2009; U.S. Appl. No. 10/528,334.
Non-Final Office Action Mailed Aug. 5, 2008; U.S. Appl. No. 10/528,334.
Non-Final Office Action Mailed Sep. 1, 2009; U.S. Appl. No. 10/528,334.
Office Action Maile Apr. 15, 2010; U.S. Appl. No. 10/557,157.
Non-Final Office Action Mailed Sep. 9, 2009; U.S. Appl. No. 10/557,157.
Non-Final Office Action Mailed Jan. 8, 2007; U.S. Appl. No. 10/841,133.
Office Action Mailed Aug. 7, 2008; U.S. Appl. No. 10/841,133.
Office Action Mailed Sep. 6, 2007; U.S. Appl. No. 10/841,133.
Non-Final Office Action Mailed Nov. 28, 2007; U.S. Appl. No. 10/841,133.
Office Action Mailed Oct. 27, 2010; U.S. Appl. No. 11/804,650.
Non-Final Office Action Mailed May 14, 2010; U.S. Appl. No. 11/804,650.
Non-Final Office Action Mailed Feb. 16, 2010; U.S. Appl. No. 12/107,589.
Office Action Mailed Jun. 25, 2010; U.S. Appl. No. 12/107,589.
Non-Final Office Action Mailed Aug. 12, 2009; U.S. Appl. No. 12/107,589.
Notice of Allowance Dated Sep. 14, 2012; U.S. Appl. No. 12/089,390.
Non-Final Office Action Dated Mar. 26, 2012; U.S. Appl. No. 12/089,390.
Non-Final Office Action Dated Mar. 19, 2012; U.S. Appl. No. 10/519,285.
Notice of Allowance Dated Dec. 9, 2011; U.S. Appl. No. 10/557,157.
Notice of Allowance Dated Nov. 23, 2011; U.S. Appl. No. 10/528,334.
Final Office Action Dated Sep. 4, 2012; U.S. Appl. No. 12/778,039.
Notice of Allowance Dated Jun. 27, 2012; U.S. Appl. No. 10/519,285.
Non-Final Office Action Dated Mar. 27, 2012; U.S. Appl. No. 12/778,039.
Non-Final Office Action Dated Aug. 24, 2012; U.S. Appl. No. 11/804,650.

\* cited by examiner

US 8,928,682 B2

METHOD AND SYSTEM OF PROCESSING IMAGES FOR IMPROVED DISPLAY

RELATED APPLICATIONS

The present application claims the benefit of U.S. Provisional Patent Application No. 61/223,650, filed Jul. 7, 2009, entitled "PERCEPTION OPTIMIZED HARDWARE," naming Gareth P. Bell as the inventor. The present application also claims the benefit of U.S. Provisional Patent Application No. 61/223,672, filed Jul. 7, 2009, entitled "PERCEPTION OPTIMIZED HARDWARE," naming Gareth P. Bell as the inventor. The present application claims the benefit of U.S. Provisional Patent Application No. 61/296,430, filed Jan. 19, 2010, entitled "PERCEPTION OPTIMIZED HARDWARE," naming Gareth P. Bell as the inventor. Each of these applications is incorporated herein by reference in its entirety and for all purposes.

BACKGROUND OF THE INVENTION

Conventional display devices with overlapping display screens are used to display color images at different depths. A backlight is typically disposed behind the display screens to generate light which passes through each display screen. An array of pixels on each display screen is used to alter the light and display respective color images at different depths.

Although the visual effect produced by conventional display devices is impressive, the amount of light required to illuminate the images on each of the color display screens is typically high. For example, light is attenuated by a respective set of color filters and a respective black matrix of each display screen. As such, the amount of light generated by the backlight must be increased to compensate for the attenuation and properly illuminate an image displayed on a front display screen. Further, since most color display screens have relatively high resolution and relatively small pixels, light is attenuated as it passes through the relatively small apertures of the black matrix around each sub-pixel of each pixel. Therefore, energy consumption of the backlights is generally high which can seriously reduce the battery life of battery-powered devices such as mobile phones or other portable electronic devices.

SUMMARY OF THE INVENTION

Accordingly, a need exists for a display device which requires less light to illuminate color images displayed at different depths. A need also exists for a display device capable of displaying color images at different depths with less energy. Embodiments of the present invention provide novel solutions to these needs and others as described below.

Embodiments of the present invention are directed to method, computer-readable medium, and system for processing images. More specifically, image processing may be performed to generate a color image for display on a color display screen and a monochrome image for display on a monochrome (e.g., a single color, black and white, etc.) display screen, where an overlap of the images may produce a resultant color image at one or more depths. The one or more depths may be determined by an amount of blur applied to one image and an amount of sharpness applied to other. The one or more depths may be determined by a gamma value of the monochrome image. Since the monochrome display screen may have fewer or no color filters and/or a lower resolution, the monochrome display screen may pass more light than conventional color display screens. As such, less light can be used to illuminate color images displayed at different depths using a color display screen and a monochrome display screen, thereby reducing energy consumption of the display device.

In one embodiment, a method of processing images includes generating a first image configured for display on a first display screen of a display device, wherein the first display screen is operable to display a plurality of shades of a single color. A second image configured for display on a second display screen of the display device is generated, wherein the second display screen is operable to display a plurality of colors, and wherein an overlap of the first and second images is configured to produce a resultant image associated with at least one depth of the display device. The second image may have a spatially uniform brightness and/or a spatially uniform luminance. The first and/or second image may be generated by blurring and/or sharpening at least one portion of each image. Alternatively, the first and/or second image may be generated by changing or setting a gamma value at least one portion of each image.

In another embodiment, a computer-readable medium having computer-readable program code embodied therein may cause a computer system to perform a method of processing images. In yet another embodiment, a system may include a processor and a memory, wherein the memory includes instructions that when executed by the system implement a method of processing images.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
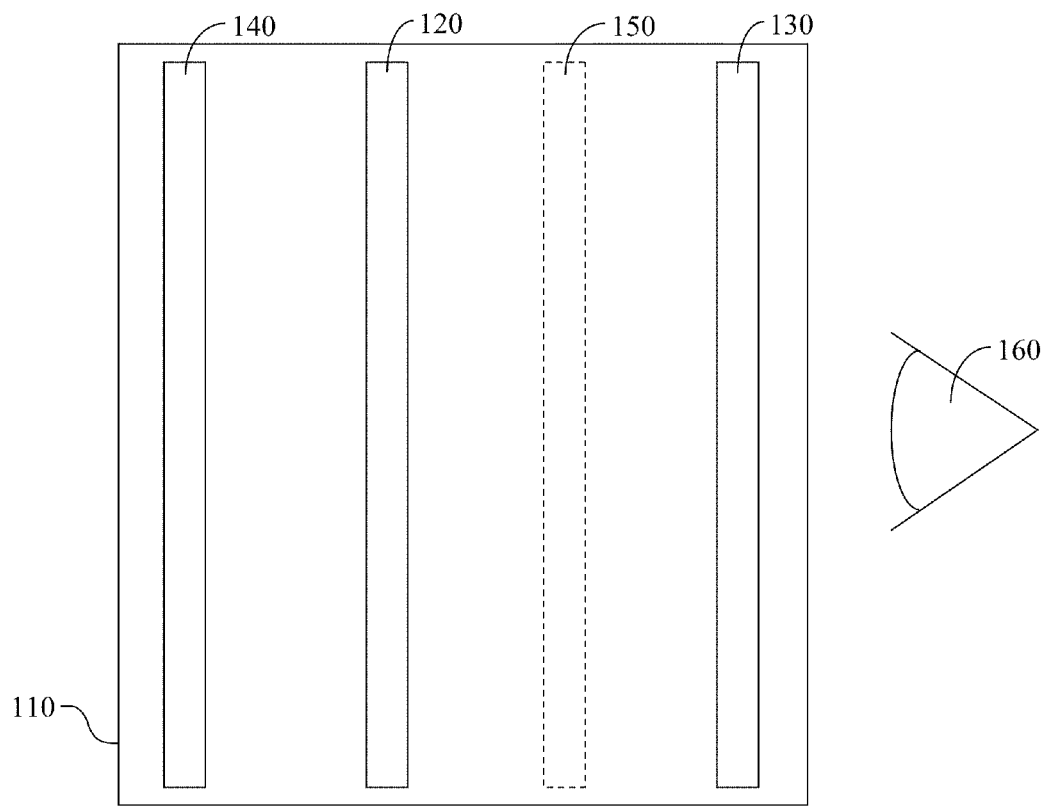
FIG. 1 shows a diagram of an exemplary display device in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "accepting," "accessing," "adding," "analyzing," "applying," "assembling," "assigning," "calculating," "capturing," "combining," "comparing," "collecting," "creating," "defining," "depicting," "detecting," "determining," "displaying," "establishing," "executing," "generating," "grouping," "identifying," "initiating," "interacting," "modifying," "monitoring," "moving," "outputting," "performing," "placing," "presenting," "processing," "programming," "querying," "removing," "repeating," "sampling," "sorting," "storing," "subtracting," "transforming," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows diagram 100 of exemplary display device 110 in accordance with one embodiment of the present invention. As shown in FIG. 1, display device 110 includes display screens 120 and 130 which can overlap and be physically spaced apart from one another. A color image displayed on the color display screen of display device 110 and a monochrome (e.g., a single color, black and white, etc.) image displayed on the monochrome display screen of display device 110 may overlap (e.g., in whole or in part) to produce a resultant color image at one or more depths (e.g., as viewed by observer 160). In one embodiment, display screen 120 may be a color display screen and display screen 130 may be a monochrome display screen. Alternatively, display screen 130 may be a color display screen and display screen 120 may be a monochrome display screen. The monochrome display screen may have fewer or no color filters and/or a lower resolution (e.g., a fewer number of pixels), and therefore, the monochrome display screen may pass more light than conventional color display screens. As such, less light can be used to illuminate color images displayed at different depths using a color display screen and a monochrome display screen, thereby reducing energy consumption of display device 110.

In one embodiment, the depth of the resultant image may be determined by an amount of blur applied to one image and an amount of sharpness applied to other. For example, if a blurred image is displayed on display screen 120 and a sharpened image is displayed on display screen 130, the resultant image may appear at one or more depths closer to observer 160 (e.g., at or toward display screen 130). As another example, if a blurred image is displayed on display screen 130 and a sharpened image is displayed on display screen 120, the resultant image may appear at one or more depths farther away from observer 160 (e.g., at or toward display screen 120). In one embodiment, a color resultant image may be displayed at any depth or depths between a color display screen and a monochrome display screen by applying a different amount of blur to the monochrome image (e.g., and applying a different amount of sharpness to the color image) or by applying a different amount of blur to the color image (e.g., and applying a different amount of sharpness to the monochrome image).

Alternatively, the depth of the resultant image may be determined by a gamma value of the monochrome image. For example, if the gamma of the monochrome image is set at a relatively low value (e.g., with a relatively high transmissivity which may make the image appear somewhat whiter or completely white when light is passed through the monochrome display screen), then the resultant image may appear at one or more depths toward or at the color display screen. As another example, if the gamma of the monochrome image is set at a relatively high value (e.g., with a relatively low transmissivity which may make the image appear without change or somewhat whiter when light is passed through the monochrome display screen), then the resultant image may appear at one or more depths toward or at the monochrome screen. In this manner, reducing the gamma of the monochrome image (e.g., increasing the transmissivity of the region of the monochrome display screen used to display the image) may cause a color resultant image to be displayed (e.g., on a display device with at least one color display screen and at least one monochrome display screen) further away from the monochrome display screen.

As shown in FIG. 1, backlight 140 may be positioned behind display screens 120 and 130 to illuminate images displayed on the display screens. For example, light generated by backlight 140 may pass through display screens 120 and 130, where each of the display screens may manipulate the light (e.g., attenuate the light using a polarizer, filter the light using one or more color filters, etc.) to display a respective image. In one embodiment, display 120 and/or display 130 may display an image by changing the transmissivity of one or more pixels or sub-pixels such that the light emitted from the display screen appears (e.g., to observer 160) as a plurality of colors (e.g., a color image) and/or a plurality of shades of a single color (e.g., a monochrome image). Backlight 140 may include one or more cold cathode fluorescent lamps (CCFLs), one or more light emitting diodes (LEDs), one or more organic light emitting diodes (OLEDs), etc.

In one embodiment, backlight 150 may be positioned between displays screens 120 and 130 to illuminate images displayed on the display screens. For example, light may be emitted from both sides of backlight 150 (e.g., toward display screen 120 and also toward display screen 130) and passed through display screens 120 and 130, where each of the display screens may manipulate the light (e.g., attenuate the light using a polarizer, filter the light using one or more color filters, etc.) to display a respective image. Display screen 120 may be a reflective display screen or transflective display screen, thereby using light emitted from backlight 150 to illuminate images displayed on display screen 120. Backlight 150 may include one or more light guides, one or more cold cathode fluorescent lamps (CCFLs), one or more light emitting diodes (LEDs), one or more organic light emitting diodes (OLEDs), etc.

In one embodiment, display device 110 may include only backlight 140. Alternatively, display device 110 may include only backlight 150. And in one embodiment, display device may include backlight 140 and backlight 150.

As shown in FIG. 1, the monochrome display screen may have a relatively low resolution compared to a conventional color displays screen. For example, the monochrome display screen may have half as many pixels (e.g., in each direction) as a conventional color display screen of the same physical size (e.g., a width and height of the display area), thereby resulting in the monochrome display screen having one fourth the number of pixels of a conventional color display screen. The pixels of the monochrome display screen may be larger than the pixels of a conventional color display screen, thereby providing a larger aperture ratio and enabling more light to pass through the monochrome display screen than a conventional color display screen. In this manner, display device 110 (e.g., including an overlapping color display screen and monochrome display screen) may use less energy than a conventional display device including overlapping color display screens.

In one embodiment, the monochrome display screen of display device 110 may have a lower resolution than the color display screen of display device 110. Additionally, the monochrome display screen may utilize pixels with a larger aperture ratio than the pixels of the color display screen.

As shown in FIG. 1, the monochrome display screen may have a smaller number of color filters than the color display screen. For example, the color display screen may have a plurality of color filters for each subpixel (e.g., one red color filter, one blue color filter, and one green color filter), thereby enabling the color display screen to display a plurality of colors. In contrast, the monochrome display screen may have one color filter or no color filters. A monochrome display screen with one color filter per pixel may be capable of displaying a plurality of shades of one or more colors, whereas a monochrome display screen with no color filters may be capable of displaying a plurality of shades of gray. As such, the monochrome display may pass more light (e.g., up to three times more light) than a conventional color display screen. In this manner, display device 110 (e.g., including an overlapping color display screen and monochrome display screen) may use less energy than a conventional display device including overlapping color display screens.

As shown in FIG. 1, the monochrome display screen may have a relatively high contrast ratio. For example, since color filters can degrade the linearly polarized light passing through a polarizer of the display device, reducing the number of color filters can improve the contrast ratio of the monochrome display. In one embodiment, the monochrome display screen may have a higher contrast ratio than the contrast ratio of the color display screen. In this manner, display device 110 (e.g., including an overlapping color display screen and monochrome display screen) may display images of higher quality (e.g., with improved contrast, less degradation, etc.) than a conventional display device including overlapping color display screens.

The monochrome display screen may have a relatively fast response time. For example, the monochrome display screen may utilize optically controlled birefringence to increase switching times. In one embodiment, the monochrome display screen may have a faster response time than the response time of the color display screen.

Although FIG. 1 shows display device with two display screens (e.g., 120 and 130), it should be appreciated that display device 110 may include more than two display screens in other embodiments. Where display device 110 includes more than two display screens, it should be appreciated that the display screens may include any combination of at least one color display screen and at least one monochrome display screen. Additionally, although the components of display device 110 are depicted with certain sizes, shapes and positions, it should be appreciated that the components of display device 110 may have different sizes, shapes and/or positions in other embodiments.

Figure 2A:
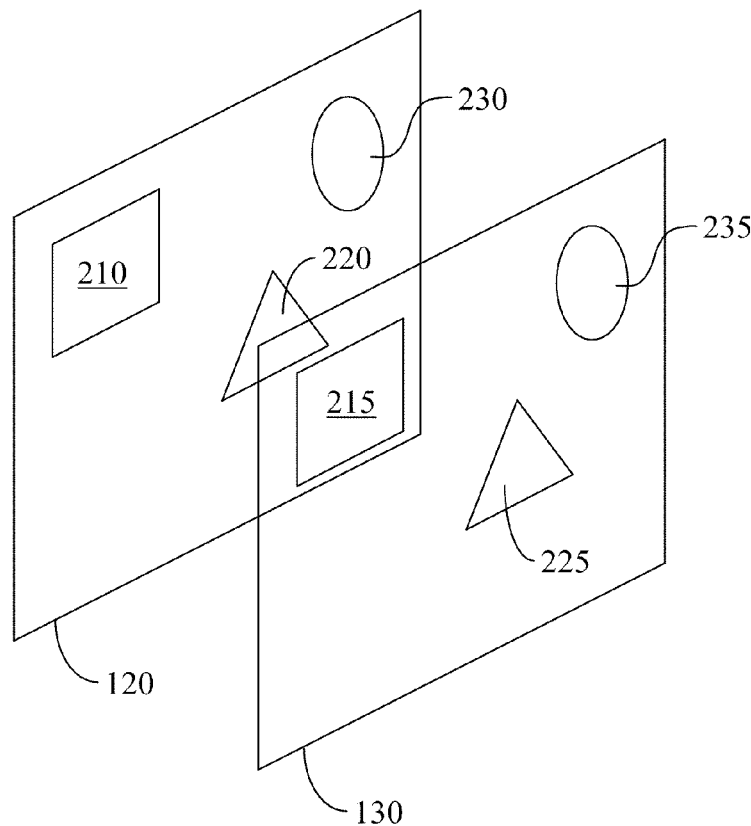
FIG. 2A shows an exemplary perspective view of images displayed on a plurality of display screens in accordance with one embodiment of the present invention.
Figure 2B:
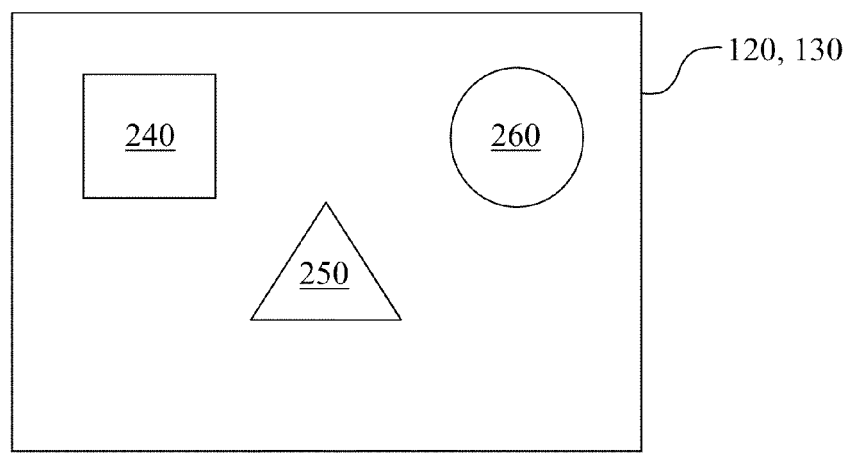
FIG. 2B shows an exemplary view of resultant images produced by an overlap of images displayed on a plurality of display screens in accordance with one embodiment of the present invention.

FIG. 2A shows exemplary perspective view 200A of images displayed on display screens 120 and 130 in accordance with one embodiment of the present invention, whereas FIG. 2B shows exemplary view 200B of resultant images produced by an overlap of images displayed on display screens 120 and 130 in accordance with one embodiment of the present invention. As shown in FIG. 2A, display screen 120 may display component images 210, 220 and 230, while display screen 130 may display component images 215, 225 and 235. Images 210 and 215 may at least partially overlap to produce resultant image 240 of FIG. 2B, images 220 and 225 may at least partially overlap to produce resultant image 250 of FIG. 2B, and images 230 and 235 may at least partially overlap to produce resultant image 260 of FIG. 2B.

In one embodiment, a resultant image (e.g., 240, 250, 260, etc.) may be produced by an overlap (e.g., either partial or complete) of a color image and a monochrome image. For example, images displayed on display screen 120 (e.g., images 210, 220 and 230) may be color images, while images displayed on display screen 130 (e.g., images 215, 225 and 235) may be monochrome images. Alternatively, images displayed on display screen 120 (e.g., images 210, 220 and 230) may be monochrome images, while images displayed on display screen 130 (e.g., images 215, 225 and 235) may be color images.

One or more images displayed on display screen 120 and/or display screen 130 may have a spatially-uniform brightness (e.g., a brightness which varies little across an image) in one embodiment. For example, different portions of a component image (e.g., 210, 220, 230, 215, 225, 235, etc.) may the same or similar brightness value. Alternatively, one or more images displayed on display screen 120 and/or display screen 130 may have a spatially-uniform luminance (e.g., a luminance which varies little across an image). For example, different portions of a component image (e.g., 210, 220, 230, 215, 225, 235, etc.) may the same or similar luminance value.

As shown in FIG. 2B, resultant images 240, 250 and 260 may be displayed such that they appear at any depth or depths (e.g., including a depth associated with display screen 120, including a depth associated with display screen 130, between display screens 120 and 130, etc.). The at least one depth of each resultant image (e.g., 240, 250, 260, etc.) may be determined by a blur of a first component image (e.g., 210, 220, 230, etc.) and a sharpness of a second component image (e.g., 215, 225, 235, etc.) or by a sharpness of the first component image (e.g., 210, 220, 230, etc.) and a blur of the second component image (e.g., 215, 225, 235, etc.). Alternatively, the at least one depth of each resultant image (e.g., 240, 250, 260, etc.) may be determined by a gamma value or level of a component image (e.g., 210, 220, 230, 215, 225, 235, etc.).

In one embodiment, a resultant image (e.g., 240, 250, 260, etc.) may have or be displayed at more than one depth. For example, a first portion of a resultant image (e.g., including a first pixel or first plurality of pixels) may be displayed at a first depth (e.g., as explained with respect to FIGS. 3A and 3B, FIGS. 4A and 4B, etc.) and a second portion of a resultant image (e.g., including a second pixel or second plurality of pixels) may be displayed at a second depth (e.g., as explained with respect to FIGS. 3A and 3B, FIGS. 4A and 4B, etc.). It should be appreciated that each of the resultant images may be displayed at a single depth (e.g., all pixels of a resultant image are displayed at the same depth) or multiple depths (e.g., at least one pixel of a resultant image is displayed at a different depth from at least one other pixel of the resultant image). As such, in one embodiment, display device 110 may implement one or more depth effects such as depth fusion (e.g., where a single three-dimensional object appears to span multiple depths using discrete display screens which may be spaced apart from another).

Although FIG. 2A shows display screen 120 with a specific number, shape, size and arrangement of component images (e.g., 210, 220 and 230), it should be appreciated that display screen 120 may have a different number, shape, size and/or arrangement of component images in other embodiments. Although FIG. 2B shows display screen 130 with a specific number, shape, size and arrangement of component images (e.g., 215, 225 and 235), it should be appreciated that display screen 130 may have a different number, shape, size and/or arrangement of component images in other embodiments. Although FIG. 2B shows a specific number, shape, size and arrangement of resultant images (e.g., 240, 250 and 260), it should be appreciated that a different number, shape, size and/or arrangement of resultant images may be displayed in other embodiments.

Figure 3A:
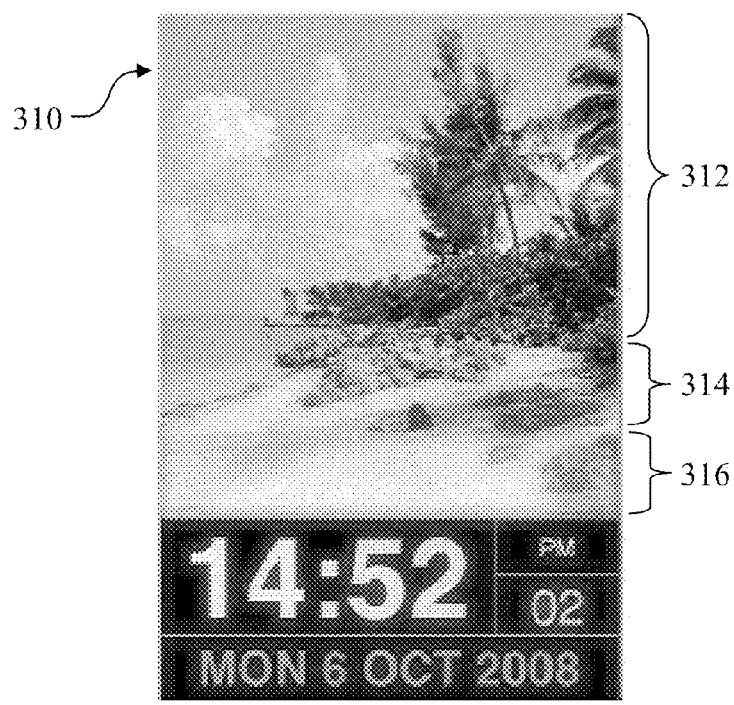
FIG. 3A shows an exemplary component image for display one display screen in accordance with one embodiment of the present invention.
Figure 3B:
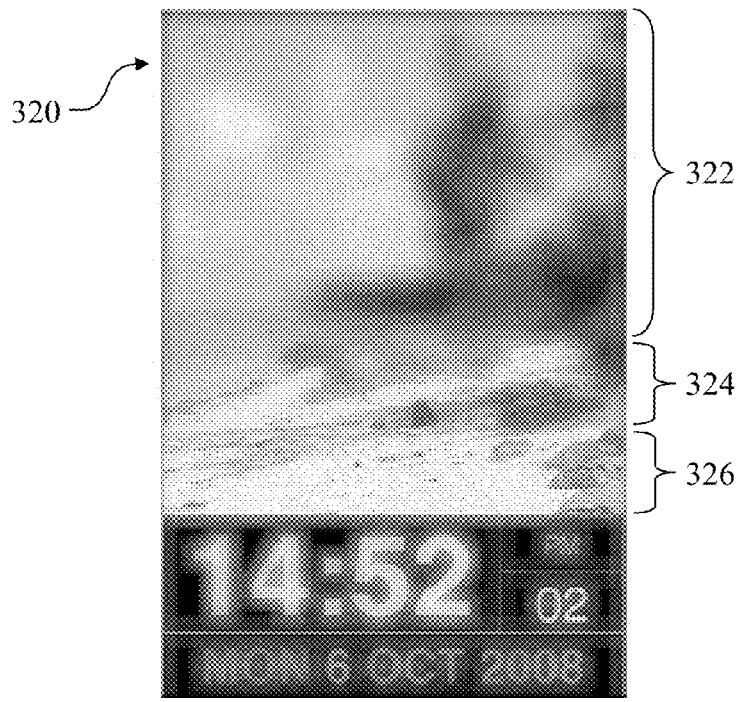
FIG. 3B shows an exemplary component image for display on another display screen in accordance with one embodiment of the present invention.

FIG. 3A shows exemplary component image 310 for display one display screen in accordance with one embodiment of the present invention, and FIG. 3B shows exemplary component image 320 for display on another display screen in accordance with one embodiment of the present invention. As shown in FIG. 3A, image 310 includes images 312, 314 and 316. As shown in FIG. 3B, image 320 includes images 322, 324 and 326. In one embodiment, image 310 may be displayed on display screen 120 and image 320 may be displayed on display screen 130. Alternatively, image 310 may be displayed on display screen 130 and image 320 may be displayed on display screen 120. In this manner, images 310 and 320 may be overlapped (e.g., in whole or in part) to produce a resultant image at one or more depths.

In one embodiment, one or more portions of image 310 may have different amounts of blur or different amounts of sharpness from at least one other portion of image 310, while one or more portions of image 320 may have different amounts of blur or different amounts of sharpness from at least one other portion of image 320. For example, images 314 and 324 may have no blur or sharpness, images 312 and 326 may be sharpened, and images 316 and 322 may be blurred. As such, different portions of a resultant image produced by an overlap of component images 310 and 320 may be displayed at different depths.

For example, where image 320 (e.g., displayed on display screen 130) overlaps image 310 (e.g., displayed on display screen 120), a first portion of the resultant image corresponding to images 312 and 322 may be displayed furthest from the observer (e.g., 160), a second portion of the resultant image corresponding to images 316 and 326 may be displayed closest to the observer (e.g., 160), and a third portion of the resultant image corresponding to images 314 and 324 may be displayed at one or more depths between the first and second portions of the resultant image. In this manner, at least one monochrome display screen and at least one color display screen may be used to produce a resultant image with a plurality of portions (e.g., sub-images or images which make up the resultant image), where each portion may be displayed in color and at a different depth (e.g., at least one portion of the resultant image may be displayed at a depth which is different from at least one other portion of the resultant image).

In one embodiment, image 310 and/or image 320 may be generated from an image which has spatially-uniform brightness. For example, before blurring and/or sharpening an initial image to generate image 310 and/or image 320, the initial image may be processed to produce an image with spatially-uniform brightness which can then be blurred and/or sharpened to generate image 310 and/or image 320. Alternatively, image 310 and/or image 320 may be generated from an image which has spatially-uniform luminance. For example, before blurring and/or sharpening an initial image to generate image 310 and/or image 320, the initial image may be processed to produce an image with spatially-uniform luminance which can then be blurred and/or sharpened to generate image 310 and/or image 320.

The depths of portions of the resultant image produced from an overlap of images 310 and 320 may be determined based upon depth cues present in an initial image in one embodiment. For example, if a first object overlaps a second object in an initial image, then a first portion of the resultant image corresponding to the first object may be assigned a depth closer to an observer (e.g., 160) than a second portion of the resultant image corresponding to the second object. The assigned depths may be used to generate the component images (e.g., by determining an amount of blur and/or an amount of sharpening to be applied to an image) used to produce the resultant image.

In one embodiment, the depths of portions of the resultant image produced from an overlap of images 310 and 320 may be determined based upon a depth mapping associated with an initial image. A depth mapping may include a respective depth for each portion (e.g., one or more pixels) of an initial image. For example, if it is determined from the depth mapping that a first object overlaps a second object in an initial image, then a first portion of the resultant image corresponding to the first object may be assigned a depth closer to an observer (e.g., 160) than a second portion of the resultant image corresponding to the second object. The assigned depths may be used to generate the component images (e.g., by determining an amount of blur and/or an amount of sharpening to be applied to an image) used to produce the resultant image.

Although FIG. 3A shows image 310 with a specific number, size and arrangement of portions, it should be appreciated that image 310 may include any number, size and/or arrangement of portions in other embodiments. Additionally, although FIG. 3B shows image 320 with a specific number, size and arrangement of portions, it should be appreciated that image 320 may include any number, size and/or arrangement of portions in other embodiments.

Figure 4A:
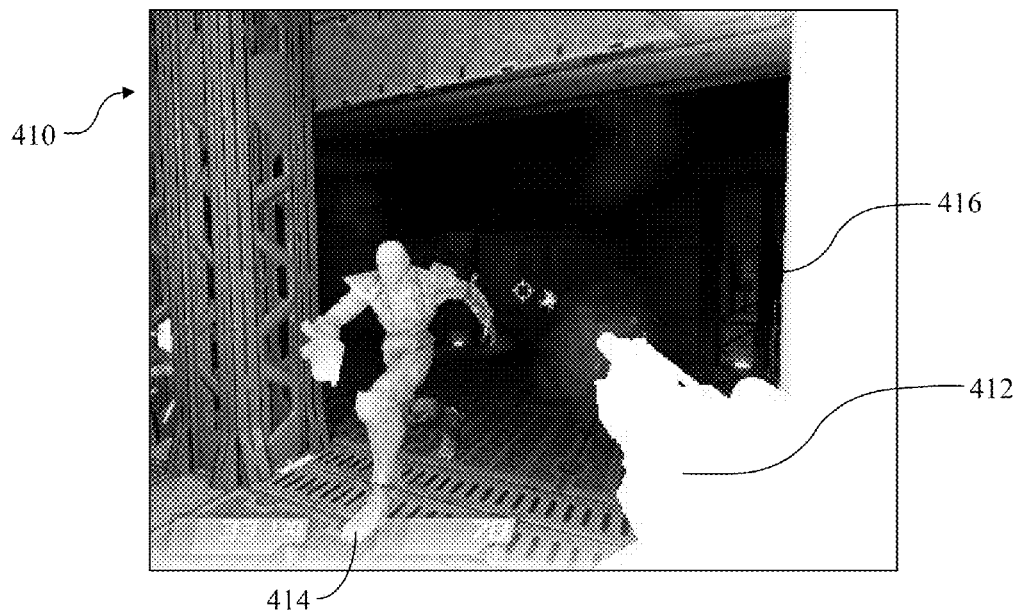
FIG. 4A shows an exemplary component image for display one display screen in accordance with one embodiment of the present invention.
Figure 4B:
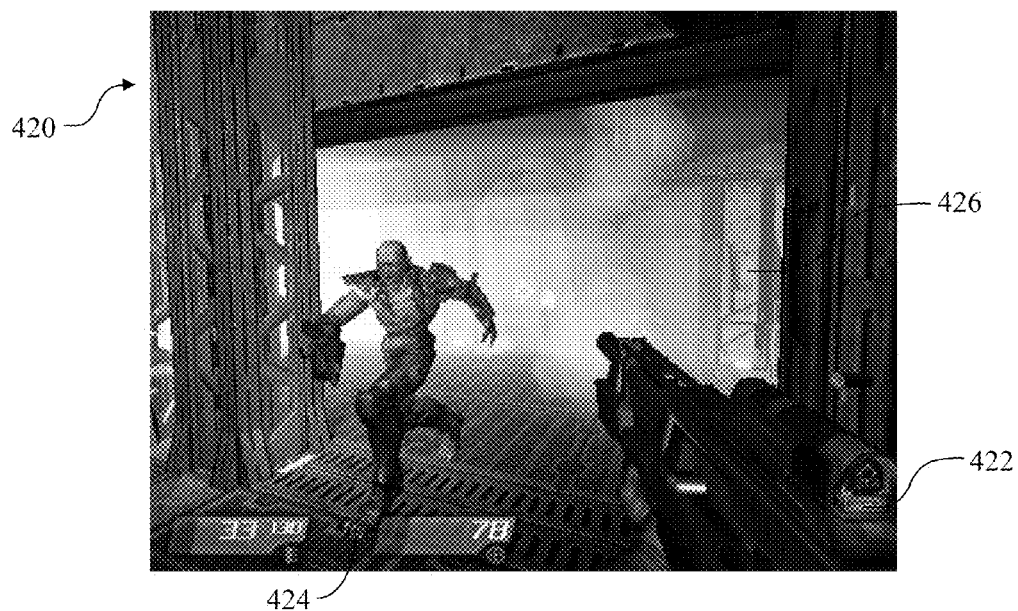
FIG. 4B shows an exemplary component image for display on another display screen in accordance with one embodiment of the present invention.

FIG. 4A shows exemplary component image 410 for display one display screen in accordance with one embodiment of the present invention, and FIG. 4B shows exemplary component image 420 for display on another display screen in accordance with one embodiment of the present invention. As shown in FIG. 4A, image 410 includes image 412 (e.g., of a gun), image 414 (e.g., a man running) and image 416 (e.g., a background of the scene). As shown in FIG. 4B, image 420 includes image 422 (e.g., of a gun), image 424 (e.g., a man running) and image 426 (e.g., a background of the scene). In one embodiment, image 410 may be displayed on display screen 120 and image 420 may be displayed on display screen 130. Alternatively, image 410 may be displayed on display screen 130 and image 420 may be displayed on display screen 120. In this manner, images 410 and 420 may be overlapped (e.g., in whole or in part) to produce a resultant image at one or more depths.

In one embodiment, one or more portions of image 410 may have different gamma levels from at least one other portion of image 410, while one or more portions of image 420 may have different gamma levels from at least one other portion of image 320. For example, image 414 may have a first gamma value, image 412 may have a second gamma value (e.g., less than the gamma value of image 414), and image 416 may have a third gamma value (e.g., more than the gamma value of image 414). As another example, image 424 may have a first gamma value, image 422 may have a second gamma value (e.g., more than the gamma value of image 424), and image 426 may have a third gamma value (e.g., less than the gamma value of image 424). As such, different portions of a resultant image produced by an overlap of component images 410 and 420 may be displayed at different depths.

For example, where image 420 (e.g., displayed on display screen 130) overlaps image 410 (e.g., displayed on display screen 120), a first portion of the resultant image corresponding to images 416 and 426 may be displayed furthest from the observer (e.g., 160), a second portion of the resultant image corresponding to images 412 and 422 may be displayed closest to the observer (e.g., 160), and a third portion of the resultant image corresponding to images 414 and 424 may be displayed at one or more depths between the first and second portions of the resultant image. In this manner, at least one monochrome display screen and at least one color display screen may be used to produce a resultant image with a plurality of portions (e.g., sub-images or images which make up the resultant image), where each portion may be displayed in color and at a different depth (e.g., at least one portion of the resultant image may be displayed at a depth which is different from at least one other portion of the resultant image).

In one embodiment, the depths of portions of the resultant image produced from an overlap of images 410 and 420 may be determined based upon depth cues present in an initial image. For example, if a first object overlaps a second object in an initial image, then a first portion of the resultant image corresponding to the first object may be assigned a depth closer to an observer (e.g., 160) than a second portion of the resultant image corresponding to the second object. The assigned depths may be used to generate the component images (e.g., by determining an amount of blur and/or an amount of sharpening to be applied to an image) used to produce the resultant image.

The depths of portions of the resultant image produced from an overlap of images 410 and 420 may be determined based upon a depth mapping associated with an initial image in one embodiment. A depth mapping may include a respective depth for each portion (e.g., one or more pixels) of an initial image. For example, if it is determined from the depth mapping that a first object overlaps a second object in an initial image, then a first portion of the resultant image corresponding to the first object may be assigned a depth closer to an observer (e.g., 160) than a second portion of the resultant image corresponding to the second object. The assigned depths may be used to generate the component images (e.g., by determining an amount of blur and/or an amount of sharpening to be applied to an image) used to produce the resultant image.

Although FIG. 4A shows image 410 with a specific number, size and arrangement of portions, it should be appreciated that image 410 may include any number, size and/or arrangement of portions in other embodiments. Additionally, although FIG. 4B shows image 420 with a specific number, size and arrangement of portions, it should be appreciated that image 420 may include any number, size and/or arrangement of portions in other embodiments.

Figure 5:
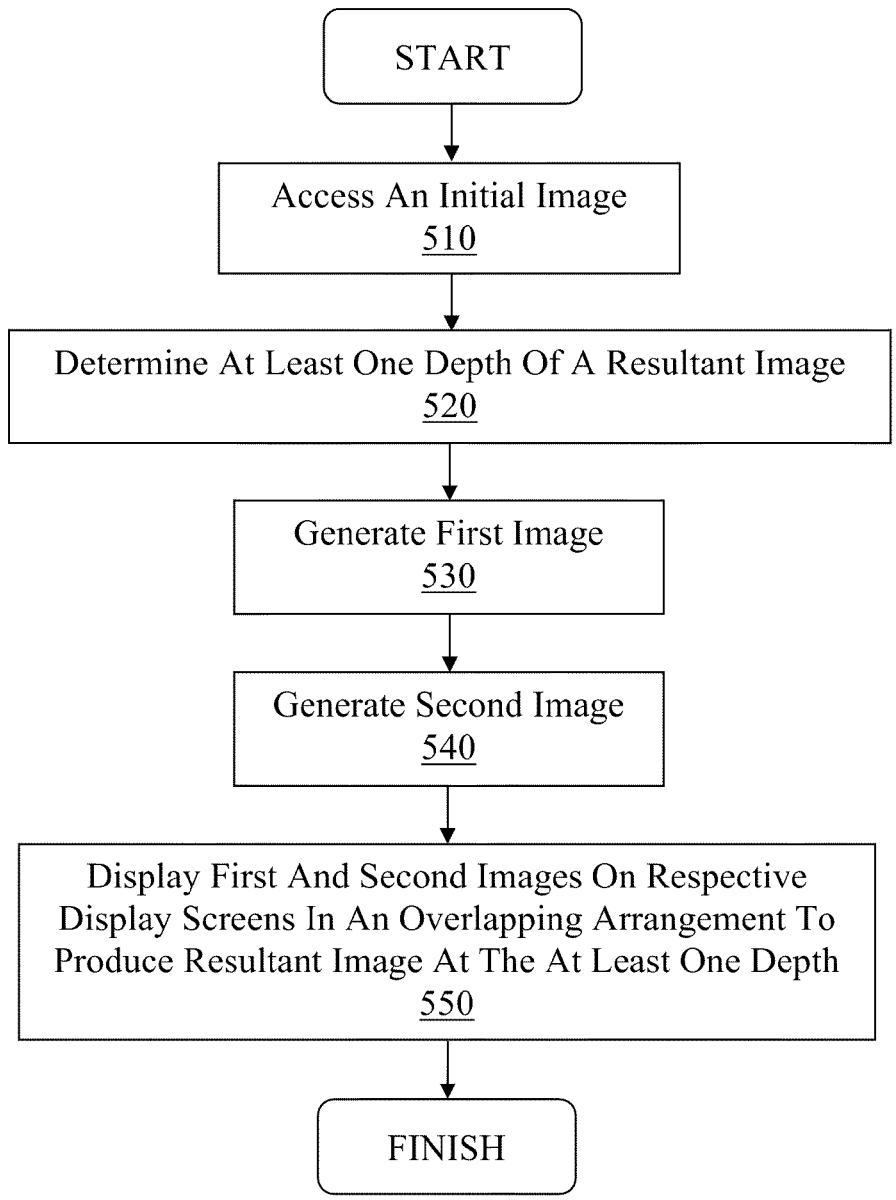
FIG. 5 shows a flowchart of an exemplary computer-implemented process for processing images in accordance with one embodiment of the present invention.
Figure 6:
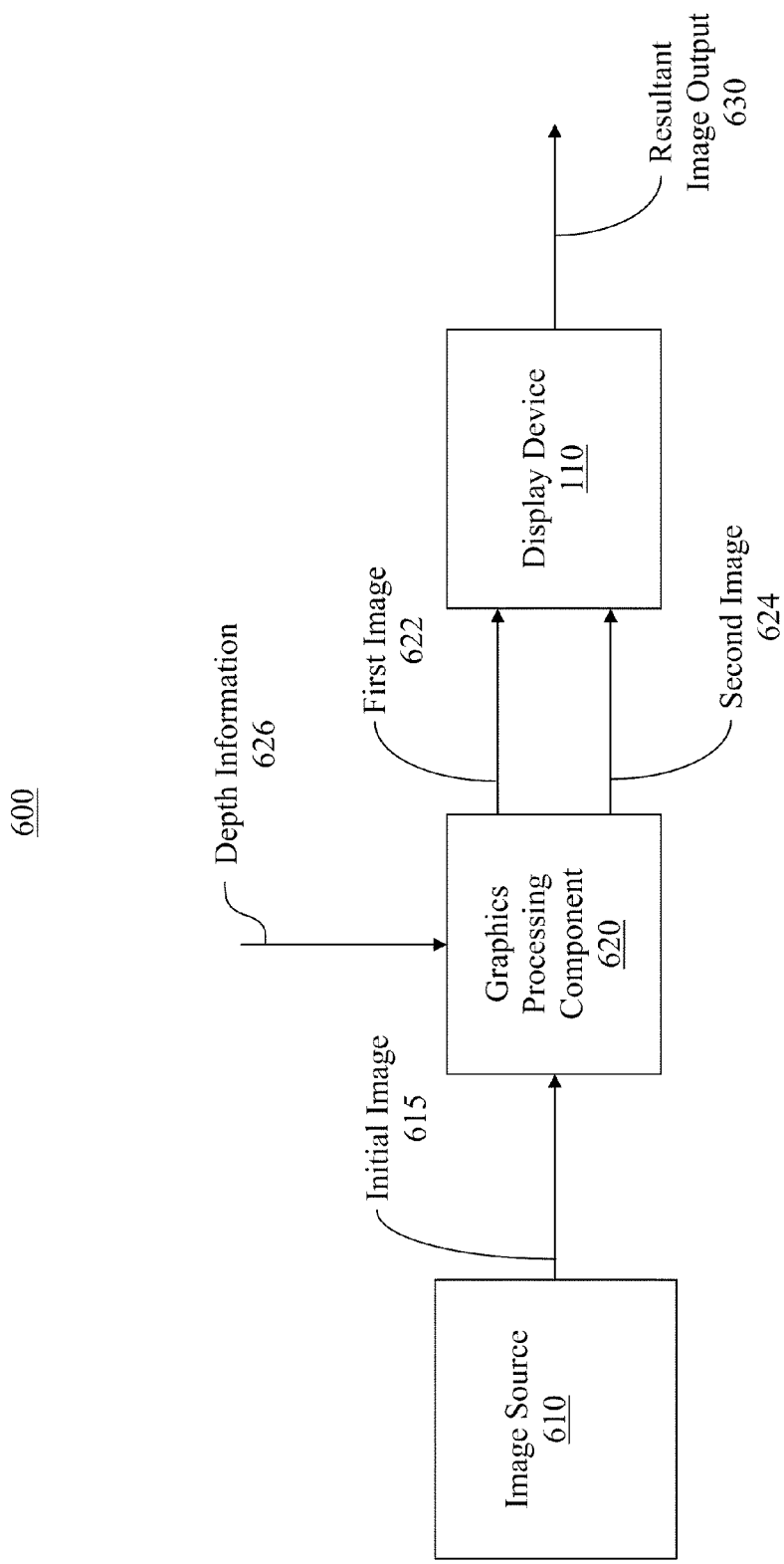
FIG. 6 shows an exemplary system for processing images in accordance with one embodiment of the present invention.

FIG. 5 shows a flowchart of exemplary computer-implemented process 500 for processing images in accordance with one embodiment of the present invention. FIG. 6 shows exemplary system 600 for processing images in accordance with one embodiment of the present invention. System 600 may be used to perform process 500 in one embodiment, and therefore, FIG. 6 will be described in conjunction with FIG. 5.

As shown in FIG. 5, step 510 involves accessing an initial image. The initial image (e.g., 615) may be accessed from an image source (e.g., 610) as shown in FIG. 4, where the image source may include a memory (e.g., a frame buffer, main memory of a computer system, etc.), a processor (e.g., a graphics processing unit (GPU), central processing unit (CPU), etc.), other system/device (e.g., coupled to system 400, etc.), etc. The initial image (e.g., 615) may include pixel data, depth data (e.g., a respective depth for each pixel of the pixel data), and/or other information associated with an image. The image (e.g., 615) may be accessed by a graphics processing component (e.g., 620) in one embodiment. Graphics processing component 620 may be implemented by hardware (e.g., a graphics processing unit, an application-specific integrated circuit (ASIC) coupled to a graphics processing unit, etc.), software (e.g., graphics drivers, operating system code, etc.), or a combination thereof.

Step 520 involves determining at least one depth of a resultant image. In one embodiment, a respective depth for each portion of the resultant image (e.g., 240, 250, 260, etc.) may be determined, where each portion may include a single pixel or more than one pixel. The one or more depths of each portion may be determined by depth cues (e.g., an overlap of objects, etc.) in the initial image. Alternatively, depth information (e.g., 626) may be used to determine the one or more depths of each portion of the resultant image, where the depth information may be a depth map in one embodiment. In one embodiment, the depth information (e.g., 626) may be accessed from image source 610 (e.g., separately or along with the pixel data). The depth information (e.g., 626) may be accessed from a different source (e.g., a separate depth buffer, z buffer, etc.) in one embodiment.

As shown in FIG. 5, step 530 involves generating a first image. The first image (e.g., 622) may be generated by processing the initial image (e.g., 615) using a graphics processing component (e.g., 620).

In one embodiment, the first image (e.g., 622) may be generated in step 530 by blurring or sharpening different portions of the initial image (e.g., 615). For example, if the depth of a particular portion of the resultant image is to appear at a depth toward the display screen (e.g., 120 or 130) on which the first image is going to be displayed, the particular portion of the initial image (e.g., 615) may be sharpened. If the depth of a particular portion of the resultant image is to appear at a depth away from the display screen (e.g., 120 or 130) on which the first image is going to be displayed, the particular portion of the initial image (e.g., 615) may be blurred. And in one embodiment, if a particular portion of the resultant image is to appear at a depth between the display screen (e.g., 120 or 130) on which the first image is going to be displayed and another display screen, the particular portion of the initial image (e.g., 615) may be left unaltered (e.g., neither blurred nor sharpened). The remaining portions of the first image may be processed in a similar fashion (e.g., by blurring, sharpening, or leaving unaltered each portion in accordance with a respective depth of each portion).

Blurring of a portion of an image in step 530 may be performed by determining each pixel value by averaging pixel values of adjacent pixels within a particular radius. The radius may affect an amount of blur applied to a portion of the initial image, and therefore, the radius to be used for blurring a particular portion of an initial image may be determined based upon a depth associated with the particular portion. For example, a larger radius may be used to blur a portion of an initial image (e.g., 615) which is to appear further away from the display screen (e.g., 120, 130, etc.) on which the first image is to be displayed.

In one embodiment, the first image (e.g., 622) may be generated from an image which has spatially-uniform brightness. For example, the initial image may be converted to a color space with a channel associated with brightness (e.g., the value channel of the HSV color space). The channel associated with brightness may be modified (e.g., set to a value of one, set to a maximum value, set to another value, etc.) for each portion of the initial image to generate a new image with a spatially-uniform brightness which is uniform or substantially uniform across the image. Where the first image (e.g., 622) is a color image, the other channels (e.g., the hue and saturation channels of the HSV color space) may be left alone. Alternatively, where the first image (e.g., 622) is a monochrome image, at least one of the other channels (e.g., the saturation channel of the HSV color space) may be set to zero, neutralized, etc. The image can then be optionally converted back to the original color space or another color space (e.g., depending upon the configuration of graphics processing component 620, display device 110, etc.).

The first image (e.g., 622) may be generated from an image which has spatially-uniform luminance in one embodiment. For example, the initial image may be converted to a color space with a channel associated with luminance (e.g., a luminance-chrominance space such as QTD, YUV, CIE LUV, CIE LAB, etc.). The channel associated with luminance may be modified (e.g., set to a value of 0.1, set to a value associated with the brightness of the dimmest color pixel, set to a value associated with the brightness of the blue pixel, etc.) for each portion of the initial image to generate a new image with a spatially-uniform brightness which is uniform or substantially uniform across the image. The image can then be optionally converted back to the original color space or another color space (e.g., depending upon the configuration of graphics processing component 620, display device 110, etc.).

In one embodiment, the first image (e.g., 622) may be generated in step 530 by changing the gamma levels of different portions of the initial image (e.g., 615). For example, if the depth of a particular portion of the resultant image is to appear at a depth toward the display screen (e.g., 120 or 130) on which the first image is going to be displayed, the gamma level of the particular portion of the initial image (e.g., 615) may be set at a relatively high value (e.g., thereby setting the transmissivity of a region of the display screen used to display the first image to a transmissivity value of the initial image, to any value between that of the initial image and a median transmissivity value, etc.). If the depth of a particular portion of the resultant image is to appear at a depth away from the display screen (e.g., 120 or 130) on which the first image is going to be displayed, the gamma level of the particular portion of the initial image (e.g., 615) may be set at a relatively low value (e.g., thereby setting the transmissivity of a region of the display screen used to display the first image to complete transmissivity, to any value in between complete transmissivity and a median transmissivity value, etc.). And in one embodiment, if a particular portion of the resultant image is to appear at a depth between the display screen (e.g., 120 or 130) on which the first image is going to be displayed and another display screen, the gamma level of the particular portion of the initial image (e.g., 615) may be set at a median value (e.g., thereby setting the transmissivity of a region of the display screen used to display the first image to a median transmissivity value). The remaining portions of the first image may be processed in a similar fashion (e.g., by increasing, decreasing, or leaving unaltered the respective gamma level of each portion in accordance with a respective depth of each portion).

The magnitude of the change and the direction of the change (e.g., increase or decrease) to the gamma level of each portion of an initial image may determine the depth of the corresponding portion of the resultant image. For example, if the gamma level of a first portion of the initial image is decreased (e.g., the transmissivity is increased to make the image appear whiter) more than a second portion of the initial image, the portion of the resultant image corresponding to the first portion may appear further away from a display screen (e.g., the display screen on which the first image is displayed) than the portion of the resultant image corresponding to the second portion. As another example, if the gamma level of a first portion of the initial image is decreased (e.g., the transmissivity is increased to make the image appear whiter) less than a second portion of the initial image, the portion of the resultant image corresponding to the first portion may appear closer to a display screen (e.g., the display screen on which the first image is displayed) than the portion of the resultant image corresponding to the second portion. As such, the magnitude and direction of the gamma level of each portion may be set or changed based upon a respective depth of each portion to generate the first image (e.g., 622).

In one embodiment, the first image generated in step 530 may be a monochrome image in the RGB color space. For example, each channel of each portion of the first image (e.g., 622) to be displayed on a front display screen (e.g., 130) may be determined in accordance with the following equations:

$$R_{front} = (V_{initial})^D$$

$$G_{front} = (V_{initial})^D$$

$$B_{front} = (V_{initial})^D$$

where D may be the depth of each portion of the initial image (e.g., 615) and/or the depth at which each portion of the resultant image is to be displayed. In one embodiment, D may range from 0 to 1, where 0 may be used to set the depth of a portion of the resultant image at a rear display screen (e.g., 120) and 1 may be used to set the depth of a portion of the resultant image at a front display screen (e.g., 130). A value of D between 0 and 1 may be used to set the depth of a portion of the resultant image between the display screens (e.g., 120 and 130). $V_{initial}$ may be determined by converting the initial image (e.g., 615) to a color space with a channel associated with brightness (e.g., the V channel of the HSV color space) and using a respective value of the channel associated with brightness for each portion as $V_{initial}$.

As another example, each channel of each portion of the first image (e.g., 622) to be displayed on a rear display screen (e.g., 120) may be determined in accordance with the following equations:

$$R_{rear} = (V_{initial})^{1-D}$$

$$G_{rear} = (V_{initial})^{1-D}$$

$$B_{rear} = (V_{initial})^{1-D}$$

where D may be the depth of each portion of the initial image (e.g., 615) and/or the depth at which each portion of the resultant image is to be displayed. In one embodiment, D may range from 0 to 1, where 0 may be used to set the depth of a portion of the resultant image at a rear display screen (e.g., 120) and 1 may be used to set the depth of a portion of the resultant image at a front display screen (e.g., 130). A value of D between 0 and 1 may be used to set the depth of a portion of the resultant image between the display screens (e.g., 120 and 130). $V_{initial}$ may be determined by converting the initial image (e.g., 615) to a color space with a channel associated with brightness (e.g., the V channel of the HSV color space) and using a respective value of the channel associated with brightness for each portion as $V_{initial}$.

As shown in FIG. 5, step 540 involves generating a second image. The second image (e.g., 624) may be generated by a graphics processing component (e.g., 620) based on the initial image (e.g., 615) and the first image (e.g., 622) in one embodiment. For example, each channel of each portion of the second image (e.g., 624) to be displayed on a rear display screen (e.g., 120) may be determined in accordance with the following equations:

$$R_{rear} = (R_{initial})/(R_{front})$$

$$G_{rear} = (G_{initial})/(G_{front})$$

$$B_{rear} = (B_{initial})/(B_{front})$$

where $R_{initial}$ is the red channel component of the initial image (e.g., 615), $G_{initial}$ is the green channel component of the initial image (e.g., 615), and $B_{initial}$ is the blue channel component of the initial image (e.g., 615). As another example, each channel of each portion of the second image (e.g., 624) to be displayed on a front display screen (e.g., 130) may be determined in accordance with the following equations:

$$R_{front} = (R_{initial})/(R_{rear})$$

$$G_{front} = (G_{initial})/(G_{rear})$$

$$B_{front} = (B_{initial})/(B_{rear})$$

where $R_{initial}$ is the red channel component of the initial image (e.g., 615), $G_{initial}$ is the green channel component of the initial image (e.g., 615), and $B_{initial}$ is the blue channel component of the initial image (e.g., 615). It should be appreciated that the second image may be generated in a color space other than RGB (e.g., HSV, LUV, etc.) in other embodiments.

In one embodiment, the resolution of the first image and/or second image may be reduced before processing one or both images (e.g., in steps 530 and/or 540). For example, the resolution of a color image may be reduced to an extent which is hardly noticeable (e.g., between approximately 50% to approximately 80% of its original size). As such, the number of operations may be reduced significantly considering that each pixel may have multiple subpixels and that at least one operation may be performed for each subpixel of each pixel. In this manner, processing efficiency may be improved by reducing the number of operations performed when processing one or more component images used to produce a resultant image.

Step 550 involves displaying the first and second images on respective display screens in an overlapping arrangement to produce the resultant image (e.g., 240, 250, 260, etc.) at the at least one depth. The resultant image may be formed by light (e.g., resultant image output 630) from a display device (e.g., 110) with at least one overlapping color display screen and at least one overlapping monochrome display screen. The first image (e.g., 622) and the second image (e.g., 624) may overlap in part (e.g., at least one portion of the first image does not overlap the second image and at least one portion of the first image does not overlap the second image) or in whole. In one embodiment, the first image (e.g., generated in step 530) may be displayed on a rear display screen (e.g., 120), and the second image (e.g., generated in step 540) may be displayed on a front display screen (e.g., 130). Alternatively, the first image (e.g., generated in step 530) may be displayed on a front display screen (e.g., 130), and the second image (e.g., generated in step 540) may be displayed on a rear display screen (e.g., 120). In one embodiment, the first image (e.g., 622) may be displayed in step 550 as a monochrome image (e.g., including a plurality of shades of at least one color) and the second image (e.g., 624) may be displayed as a color image (e.g., including a plurality of colors). Alternatively, the first image (e.g., 622) may be displayed in step 550 as a color image (e.g., including a plurality of colors) and the second image (e.g., 624) may be displayed as a monochrome image (e.g., including a plurality of shades of at least one color).

In one embodiment, process 500 may be repeated to create multiple resultant images. The multiple resultant images may be displayed successively by a display device (e.g., 110) to display a color video with depth (e.g., where each resultant image may be a frame of the video). One or more objects displayed in the resultant images may move in the x or y planes (e.g., from side-to-side, top-to-bottom, or bottom-to-top) or in the z plane (e.g., from depth closer to an observer to a depth farther away from the observer, or from depth farther away from an observer to a depth closer to the observer). The video may be created using an overlapping color display screen and an overlapping monochrome display screen, thereby passing more light and consuming less energy than a conventional display with overlapping color display screens.

Although FIGS. 5 and 6 have been described with respect to two display screens and two images, it should be appreciated that a resultant image may be produced by overlapping any number of display screens capable of displaying any number of component images. Where more than two display screens are used, it should be appreciated that the display screens may include any combination of at least one color display screen and at least one monochrome display screen. Additionally, although the components of system 600 are depicted with a specific number and arrangement of components, it should be appreciated that system 600 may have a different number and/or arrangement of components in other embodiments. For example, graphics processing component 620 may be combined with or disposed inside of a housing of display device 110.

Figure 7:
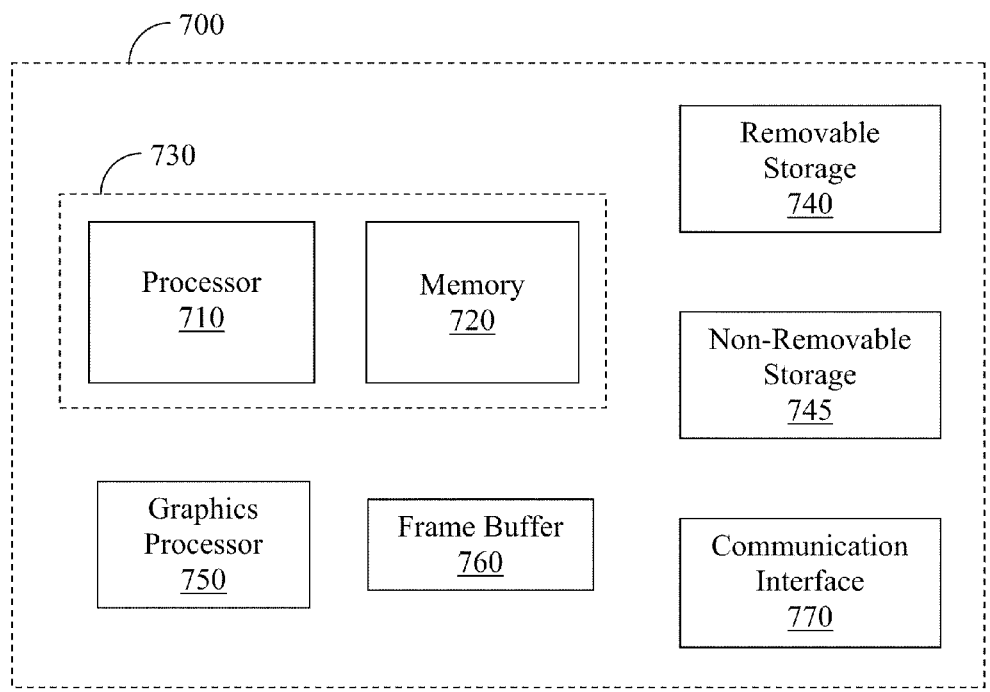
FIG. 7 shows an exemplary computer system platform upon which embodiments of the present invention may be implemented.

FIG. 7 shows exemplary computer system platform 700 upon which embodiments of the present invention may be implemented. As shown in FIG. 7, portions of the present invention may be implemented by execution of computer-readable instructions or computer-executable instructions that may reside in components of computer system platform 700 and which may be used as a part of a general purpose computer network (not shown). It is appreciated that computer system platform 700 of FIG. 7 is merely exemplary. As such, the present invention can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

In one embodiment, depicted by dashed lines 730, computer system platform 700 may include at least one processor 710 and at least one memory 720. Processor 710 may include a central processing unit (CPU) or other type of processor. Depending on the configuration and/or type of computer system environment, memory 720 may include volatile memory (e.g., RAM), non-volatile memory (e.g., ROM, flash memory, etc.), or some combination of the two. Additionally, memory 720 may be removable, non-removable, etc.

In other embodiments, computer system platform 700 may include additional storage (e.g., removable storage 740, non-removable storage 745, etc.). Removable storage 740 and/or non-removable storage 745 may include volatile memory, non-volatile memory, or any combination thereof. Additionally, removable storage 740 and/or non-removable storage 745 may include CD-ROM, digital versatile disks (DVD) or other optical storage, magnetic cassettes, magnetic tape, magnetic disk storage or other magnetic storage devices, or any other medium which can be used to store information for access by computer system platform 700.

As shown in FIG. 7, computer system platform 700 may communicate with other systems, components, or devices via communication interface 770. Communication interface 770 may embody computer readable instructions, data structures, program modules or other data in a modulated data signal (e.g., a carrier wave) or other transport mechanism. By way of example, and not limitation, communication interface 770 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 770 may also couple computer system platform 700 to one or more input devices (e.g., a keyboard, mouse, pen, voice input device, touch input device, etc.) and/or output devices (e.g., a display, speaker, printer, etc.). In one embodiment, communication interface 770 may couple computer system platform 700 to a multi-component display (e.g., 110).

As shown in FIG. 7, graphics processor 750 may perform graphics processing operations on graphical data stored in frame buffer 760 or another memory (e.g., 720, 740, 745, etc.) of computer system platform 700. Graphical data stored in frame buffer 760 may be accessed, processed, and/or modified by components (e.g., graphics processor 750, processor 710, etc.) of computer system platform 700 and/or components of other systems/devices. Additionally, the graphical data may be accessed (e.g., by graphics processor 750) and displayed on an output device coupled to computer system platform 700. Accordingly, memory 720, removable storage 740, non-removable storage 745, frame buffer 760, or a combination thereof, may be a computer-readable medium or computer-usable medium and may include instructions that when executed by a processor (e.g., 710, 750, etc.) implement a method (e.g., process 500 of FIG. 5) of processing images (e.g., stored in frame buffer 760) for improved display quality on a display device (e.g., 110).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of processing images, said method comprising:
    accessing an initial image, which has a spatially uniform brightness;
    generating a first image from said initial image, wherein said first image is configured for display on a first display screen of a display device, wherein said first display screen is operable to display a plurality of shades of a single color;
    applying at least one of blurring and sharpening to a plurality of portions of said first image such that a first portion of said first image has a different amount of blur or sharpness from a second portion of said first image;
    generating a second image from said initial image, wherein said second image is configured for display on a second display screen of said display device, wherein said second display screen is operable to display a plurality of colors;
    applying at least one of blurring and sharpening to a plurality of portions of said second image such that a first portion of said second image has a different amount of blur or sharpness from a second portion of said second image; and
    wherein an overlap of said first and second images is configured to produce a resultant image associated with a variable depth located at or between positions of said first display screen and said second display screen of said display device, such that different portions of said resultant image is displayable at different depths, and
    wherein said generating said first image further comprises determining an amount of blur associated with said first portion of said first image based on a first depth, and blurring a portion of said initial image corresponding to said first portion of said first image based on said amount of blur to generate said first portion of said first image, and
    wherein said generating said second image further comprises sharpening said portion of said initial image corresponding to said first portion of said first image based on said first image and said first depth to generate said first portion of said second image.

2. The method of claim 1 further comprising:
    displaying said first image on said first display screen and said second image on said second display screen in an overlapping arrangement to produce said resultant image associated with at least one depth.

3. The method of claim 1, wherein said second image has a spatially uniform brightness.

4. The method of claim 1, wherein said second image has a spatially uniform luminance.

5. The method of claim 1, wherein said generating said first image further comprises changing a gamma value of a third portion of said initial image based upon said first depth to generate a third portion of said first image that corresponds to said third portion of said initial image, and wherein said generating said second image further comprises generating a third portion of said second image based on said third portion of said first image and a brightness component.

6. The method of claim 1, wherein said generating said second image further comprises reducing a resolution of an initial image used to generate said second image.

7. The method of claim 1, wherein said first display screen overlaps said second display screen.

8. The method of claim 1, wherein said second display screen overlaps said first display screen.

9. The method of claim 1, wherein a first resolution of said first display screen is lower than a second resolution of said second display screen.

10. The method of claim 1, wherein a first response time of said first display screen is faster than a second response time of said second display screen.

11. A method of processing images, comprising:
accessing an initial image, which has a spatially uniform brightness;
generating a first image from said initial image, wherein said first image is configured for display on a first display screen of a display device, wherein said first display screen is operable to display a plurality of shades of a single color;
applying at least one of blurring and sharpening to a plurality of portions of said first image such that a first portion of said first image has a different amount of blur or sharpness from a second portion of said first image;
generating a second image from said initial image, wherein said second image is configured for display on a second display screen of said display device, wherein said second display screen is operable to display a plurality of colors;
applying at least one of blurring and sharpening to a plurality of portions of said second image such that a first portion of said second image has a different amount of blur or sharpness from a second portion of said second image; and
wherein an overlap of said first and second images is configured to produce a resultant image associated with a variable depth located at or between positions of said first display screen and said second display screen of said display device, such that different portions of said resultant image is displayable at different depths, and
wherein said generating said second image further comprises determining an amount of blur associated with said first portion of said second image based on a first depth, and blurring a portion of said initial image corresponding to said first portion of said second image based on said amount of blur to generate said first portion of said second image, and
wherein said generating said first image further comprises sharpening said portion of said initial image corresponding to said first portion of said second image based on said second image and said first depth to generate said first portion of said first image.

12. The method of claim 11, further comprising:
displaying said first image on said first display screen and said second image on said second display screen in an overlapping arrangement to produce said resultant image associated with at least one depth.

13. The method of claim 11, wherein said second image has a spatially uniform brightness.

14. The method of claim 11, wherein said second image has a spatially uniform luminance.

15. The method of claim 11, wherein said generating said first image further comprises changing a gamma value of a third portion of said initial image based upon said first depth to generate a third portion of said first image that corresponds to said third portion of said initial image, and wherein said generating said second image further comprises generating a third portion of said second image based on said third portion of said first image and a brightness component.

16. The method of claim 11, wherein said generating said second image further comprises reducing a resolution of an initial image used to generate said second image.

17. The method of claim 11, wherein said first display screen overlaps said second display screen.

18. The method of claim 11, wherein said second display screen overlaps said first display screen.

19. The method of claim 11, wherein a first resolution of said first display screen is lower than a second resolution of said second display screen.

20. The method of claim 11, wherein a first response time of said first display screen is faster than a second response time of said second display screen.

21. A system comprising a processor and a memory, wherein said memory comprises instructions that when executed by said system implement a method of processing images, said method comprising:
accessing an initial image, which has a spatially uniform brightness;
generating a first image from said initial image, wherein said first image is configured for display on a first display screen of a display device, wherein said first display screen is operable to display a plurality of shades of a single color;
applying at least one of blurring and sharpening to a plurality of portions of said first image such that a first portion of said first image has a different amount of blur or sharpness from a second portion of said first image;
generating a second image from said initial image, wherein said second image is configured for display on a second display screen of said display device, wherein said second display screen is operable to display a plurality of colors;
applying at least one of blurring and sharpening to a plurality of portions of said second image such that a first portion of said second image has a different amount of blur or sharpness from a second portion of said second image; and
wherein an overlap of said first and second images is configured to produce a resultant image associated with a variable depth located at or between positions of said first display screen and said second display screen of said display device, such that different portions of said resultant image is displayable at different depths, and
wherein said generating said first image further comprises determining an amount of blur associated with said first portion of said first image based on a first depth, and blurring a portion of said initial image corresponding to said first portion of said first image based on said amount of blur to generate said first portion of said first image, and
wherein said generating said second image further comprises sharpening said portion of said initial image corresponding to said first portion of said first image based on said first image and said first depth to generate said first portion of said second image.

22. The system of claim 21, wherein said method further comprises:
displaying said first image on said first display screen and said second image on said second display screen in an overlapping arrangement to produce said resultant image associated with at least one depth.

23. The system of claim 21, wherein said second image has a spatially uniform brightness.

24. The system of claim 21, wherein said second image has a spatially uniform luminance.

25. The system of claim 21, wherein said generating said first image further comprises changing a gamma value of a third portion of said initial image based upon said first depth to generate a third portion of said first image that corresponds to said third portion of said initial image, and wherein said generating said second image further comprises generating a third portion of said second image based on said third portion of said first image and a brightness component.

26. The system of claim 21, wherein said generating said second image further comprises reducing a resolution of an initial image used to generate said second image.

27. The system of claim 21, wherein said first display screen overlaps said second display screen.

28. The system of claim 21, wherein said second display screen overlaps said first display screen.

29. The system of claim 21, wherein a first resolution of said first display screen is lower than a second resolution of said second display screen.

30. The system of claim 21, wherein a first response time of said first display screen is faster than a second response time of said second display screen.

* * * * *